Oct. 19, 1965  R. MERZ  3,212,228
MACHINE FOR FILLING AND CAPPING CARTRIDGES
Filed June 11, 1962  5 Sheets-Sheet 1

FIG. I.

INVENTOR.
RUDOLF MERZ
BY
Attorney

INVENTOR.
RUDOLF MERZ

FIG. 11.

INVENTOR.
RUDOLF MERZ

United States Patent Office 3,212,228
Patented Oct. 19, 1965

3,212,228
MACHINE FOR FILLING AND CAPPING CARTRIDGES
Rudolf Merz, Rochester, N.Y., assignor to Crosman Arms Company, Inc., Fairport, N.Y., a corporation of New York
Filed June 11, 1962, Ser. No. 201,615
13 Claims. (Cl. 53—88)

The present invention relates to machines for filling cartridges with gas under pressure, and more particularly to a machine for automatically filling and capping $CO_2$ cartridges, such as are used, for instance, in gas-fired guns.

Heretofore, most $CO_2$ cartridges have been capped, after flowing the $CO_2$ gas into them, by welding the caps in place. Where the cartridges are so capped, however, so much extra room has to be provided in the filling and capping machine for the welding tools or electrodes that nearly half as much gas, as is charged into a cartridge, is lost at each filling operation. Moreover, with prior filling and capping methods there is always a high percentage of leaky cartridges because it is difficult to effect a completely air-tight weld of the caps on the cartridges. When a leak is detected, either the cartridge has to be discarded or the welded cap must be cut off the cartridge, the cartridge has to be refilled, and a new cap has to be welded thereon. If the leak is not detected, the cartridge will rapidly lose pressure and in a short time will be useless.

Aside from this the filling and capping machines heretofore used have been expensive and bulky. Moreover, the requirement for welding apparatus has precluded the use of these machines for filling cartridges with combustible gases such as butane or propane which would explode during the welding of the cap to the cartridge.

A further disadvantage of the prior capping method involving welding of caps to the gas-filled cartridges is the impracticability of refilling after use because of the limitations and difficulties of removing welded caps from the cartridges. While it may be possible to machine off the punctured cap from an expended cartridge, and to thereafter fill and recap the cartridge for at least a second time, the machining operation requires that at least a portion of the neck of the cartridge be removed; and the cartridge has only a limited length of neck.

The primary object of this invention is to provide an improved method and improved apparatus for filling and capping cartridges containing gas under pressure.

Another object of this invention is to provide an improved machine of the type described which will substantially reduce the loss of gas during the filling and sealing of gas cartridges.

Another object of the invention is to provide a method and apparatus for filling and capping cartridges by which cartridges can be capped easier and with greater security against leakage than with prior filling and capping methods and apparatus.

Another object of this invention is to provide a machine of the type described wherein cartridges can be filled with gas and capped while relatively cold and at substantially room temperature or below.

Another object of this invention is to provide a machine of the type described wherein a cartridge is filled with gas under pressure and capped in such manner that the caps may be readily removed from an exhausted cartridge so that the latter may be refilled time after time.

Other objects of the invention will be apparent hereinafter from the specification and from the recital of the appended claims, particularly when read in conjunction with the accompanying drawings.

The machine illustrated in the drawings is particularly adapted to fill and cap conventionally-shaped $CO_2$ cartridges which have elongate, generally cylindrical bodies, rounded bottoms, and relatively short necks. The necks of these cartridges have radially-extending flanges or shoulders below the open ends of the cartridges. The caps adapted to be employed on these cartridges have depending skirts which are pleated. A cap of this type is disclosed in my pending application Ser. No. 66,253, filed Oct. 31, 1960.

The machine illustrated comprises a rotary, elongate, horizontally disposed drum or carrier which is provided around its periphery with a plurality of angularly- and axially-spaced fixtures that are disposed in rows circularly about and longitudinally of the axis of the drum. Alternate fixtures circumferentially of the drum are in the form of sockets for holding cartridges and the intermediate fixtures carry collets for holding caps for the cartridges. Mounted above the drum are a plurality of filling and capping stations, one for each circular row or fixtures in the drum.

Cartridges are supplied to the drum from chutes which are disposed at one side of the drum. There is one chute for each circular row of fixtures in the drum. The caps for the cartridges are picked up from cap feeding stations located below the drum, one of which is aligned with each circular row of fixtures in the drum and which are supplied by chutes, of which there is one for each circular row of fixtures in the drum. The drum is indexed periodically to register the collets in one of the longitudinal rows at one time with the cap feeding stations and at another time with the filling and capping stations, and to register the socket fixtures at one time with the several cartridge supply stations and at another time with the several filling and capping stations.

When a longitudinal row of collets is in registry with the cap feeding stations, the drum is lowered to cause each of these collets to pick up a cap from the aligned cap feeding station. When the longitudinal row of collets is in registry with the filling and capping stations, the drum is raised to cause the caps carried by the several collets of the row to be transferred from those collets to cap-holding fixtures at the filling and capping stations. When a row of socket fixtures is in registry with the several chutes at the cartridge supply stations, cartridges are supplied to these fixtures. When a longitudinal row of socket fixtures is in registry with the filling and capping stations, the drum is raised to bring the open ends of the cartridges in the row into sealed relation with gas filling chambers at the filling and capping stations.

Gas under pressure is admitted to each chamber to fill the cartridge positioned therein. Concurrently with the admission of the gas to the chambers, the drum continues to be elevated so that the cartridges being filled effect a reduction in the size of the chambers thereby minimizing the amount of gas which has to be discharged to atmosphere and wasted at the end of a filling operation. As the cartridges continue to be elevated the upper ends of the cartridges force the caps, which have previously been placed in the cap holding fixtures of the capping and filling stations, into dies formed in the upper chamber walls. The dies cause the caps to be pressed and crimped sealingly over the open cartridge ends and around the necks of the cartridges, securely fixing the caps in sealing engagement over the mouths of the cartridges. When the cartridges have been capped, the supply of gas being fed to the chambers is cut off. Thereafter the capped cartridges are withdrawn from the filling and capping mechanisms by lowering the carrier.

There is a discharge station at one side of the drum, diametrically opposite the cartridge supply stations; and after a longitudinal row of cartridges has been filled and capped it is carried by the drum, as the drum is indexed, to this discharge station. There the now filled and capped cartridges are discharged into chutes which carry them away from the machine.

Figure 1:
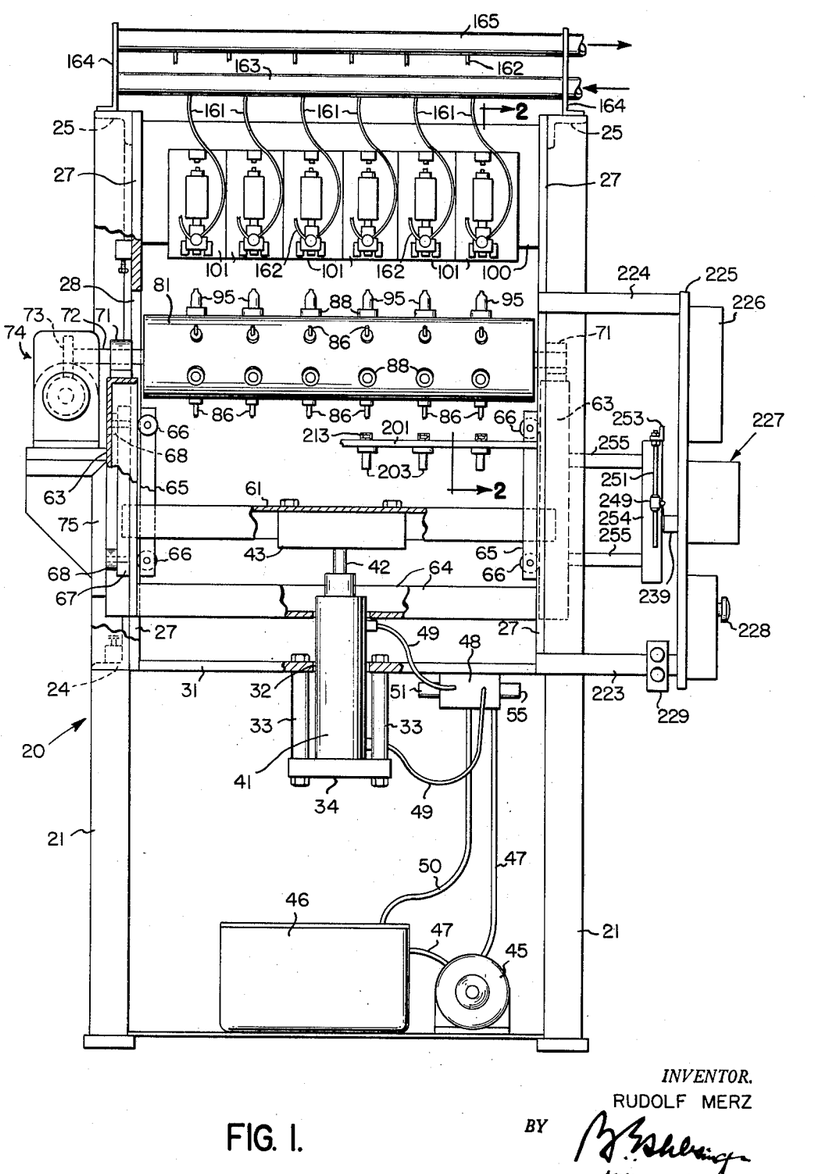
FIG. 1 is a front elevational view of a machine built according to one embodiment of my invention parts thereof being cut away.
Figures 2, 8:
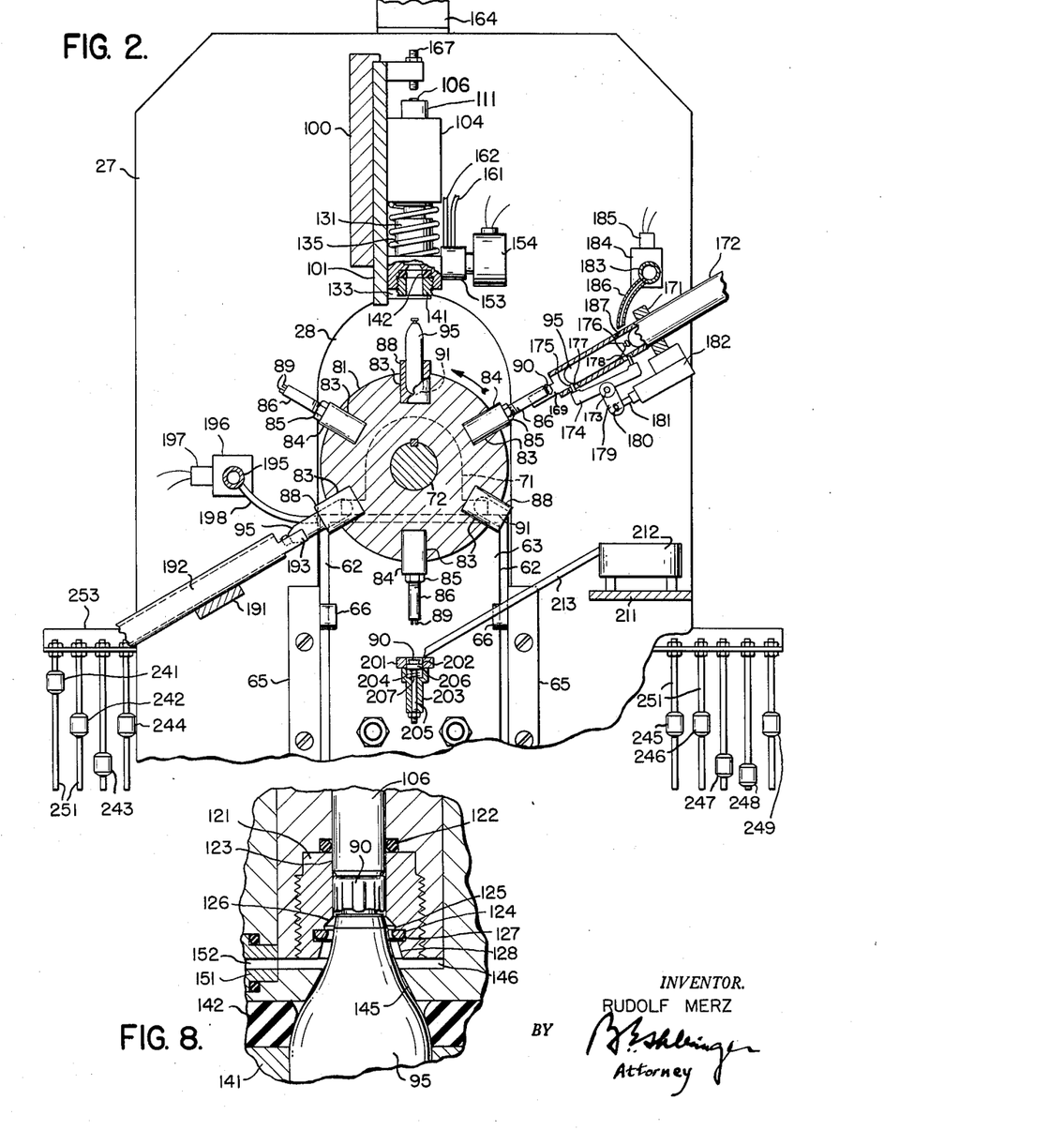
FIG. 2 is an enlarged sectional view taken along the line 2—2 of FIG. 1 and looking in the direction of the arrows.
FIG. 8 is an enlarged, fragmentary view of the capping mechanism and other parts in the positions shown in FIG. 7.

Referring now to the drawings by numerals of reference, the frame for my cartridge filling and capping machine is designated generally at 20. The frame comprises legs or uprights 21, and horizontally disposed angle irons 24 and 25. At each end of frame 20 there is secured a large rectangular end plate 27 (FIGS. 1 and 2). Each plate 27 has a slot 28 therethrough, the purpose of which will appear hereinafter.

Welded or otherwise secured at opposite ends thereof to the lower edges of end plates 27 is a horizontally disposed bearing plate 31. Suspended below an aperture 32 in the center of bearing plate 31 by conventional spacers 33 is a horizontally disposed platform 34. Mounted on platform 34 and extending upwardly therefrom through aperture 32 in plate 31 is a cylinder jacket or housing 41 for a hydraulically actuated piston (not illustrated). The piston in housing 41 is connected by piston rod 42 to a vertically movable working head or block 43. Hydraulic fluid is adapted to be pumped by a pump 45 from a reservoir 46 in the bottom of frame 20, through conduits 47 to a conventional control valve 48 secured to the bottom of plate 31; and the fluid is conducted to and from valve 48 to opposite ends of cylinder 41 by tubing 49. The exhaust fluid is returned to the reservoir or sump 46 by conduit 50. The valve 48 is shifted in opposite directions to control the direction of flow of the motive fluid to cylinder 41 by selectively energizing solenoids 51 and 55. When neither solenoid is energized, valve 48 assumes a neutral position thereby to retain the piston in housing 41 in a stationary position.

Head 43 is bolted to the bottom of an inverted channel iron 61 which extends horizontally between opposite ends of frame 20. Opposite ends of channel iron 61 project through the slots 28 in the end plates 27. Secured to each end of channel iron 61 is a rectangular, box-shaped slide 63. The interiors of the box-shaped slides 63 face inwardly of the frame 20 and toward one another; and the vertically extending sides 62 (FIG. 2) of the box-shaped slides 63 slide in the slots 28 in end plates 27. The bottoms of slides 63 are connected to one another by means of two horizontally disposed angle irons 64 which extend parallel to one another on opposite sides of the piston housing 41. Secured to the inner face of each end plate 27 on opposite sides of its slot 28 are two, elongate, vertically disposed bars 65. Rotatably mounted on each bar 65 adjacent the ends thereof are guide rollers 66 which overlie and roll upon the inner edges of the vertical sides 62 of slides 63. Similar bars 67 (shown only at one end of frame 20 in FIG. 1) are secured to the outer faces of the end plates 27 and have rotatably mounted thereon rollers 68 which are adapted to roll upon the exterior surfaces of the sides 62 of the box-shaped slides 63. Rollers 66 and 68 thus permit vertical movement of the slides 63, but substantially eliminate both lateral and endwise movement of the slides 63 relative to the end plates 27.

Secured to the top of each slide 63 is a bored bearing 71. Rotatably journaled adjacent opposite ends thereof in bearings 71 is an elongate shaft 72. Shaft 72 projects outwardly beyond one end of frame 20 and has secured thereto a gear 73 (FIG. 1). Gear 73 is adapted to be driven intermittently by a conventional indexing mechanism 74 of the one revolution clutch type which is mounted on a bracket 75 that is secured to the exterior of the adjacent slide 63. The indexing mechanism 74 is adapted to reciprocate vertically with slides 63 and the shaft 72 so that it will at all times mesh with gear 73.

Figures 5, 9, 10:
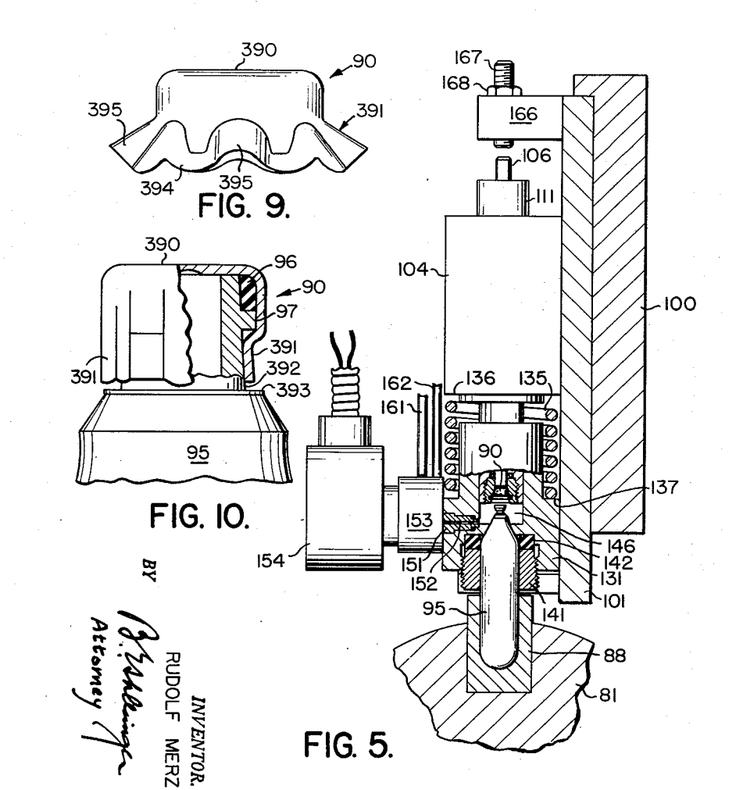
FIG. 5 is a partial sectional view, taken at right angles to the views of FIGS. 3 and 4, illustrating fragmentarily the carrier indexed to align a cartridge with the capping mechanism and elevated to place the open end of the cartridge in gas filling position.
FIG. 9 is a side elevation of one of a cap such as may be used in capping a cartridge in the machine illustrated.
FIG. 10 is a fragmentary side elevation, with part of the cap broken away, showing how such a cap is pressed and crimped onto a cartridge in the machine illustrated.
Figure 6:
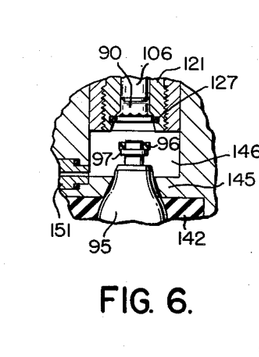
FIG. 6 is a fragmentary view of the parts shown in FIG. 5 and in the same plane as FIG. 5 but on a further enlarged scale.
Figure 7:
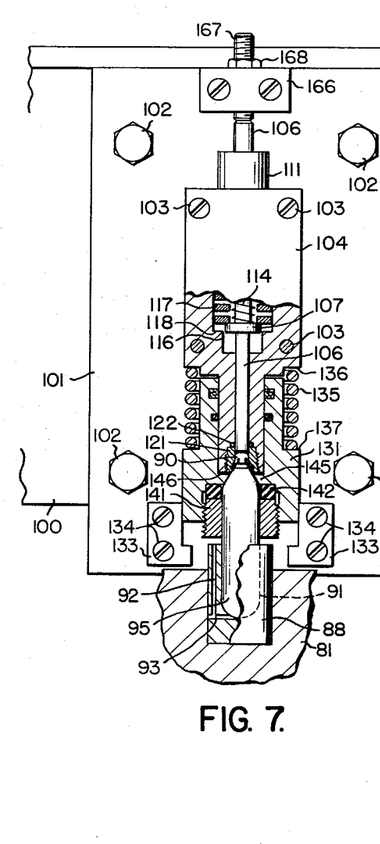
FIG. 7 is a front view, broken away in part, of the parts shown in FIG. 5, but illustrating the positions of the carrier, cartridge, and other parts at the instant of capping the cartridge.

Secured coaxially on shaft 72 intermediate the end plates 27 is an indexible drum or carrier 81. Carrier 81 is provided with a plurality of circular, radially extending recesses 83 (FIG. 2) in its peripheral surface. Recesses 83, thirty-six in all in the embodiment shown, are arranged in six parallel rows which extend longitudinally of drum 81 intermediate the ends thereof. The six rows are equi-angularly spaced about the axis of drum 81. Each row includes six recesses 83 which are equally spaced longitudinally relative to one another. In alternate and intervening rows, respectively, of recesses 83, there are secured fixtures 84 and 88. Threaded into each of the fixtures 84 and secured therein by a lock-nut 85 is a sleeve 86 in the bore to which there is fastened by means of a pin (FIG. 3) a split collet 87 formed to have four resilient collet fingers 89 (FIG. 2) which are adapted to fit snugly into a cartridge cap 90 to frictionally grip and hold the same on the collet. Each fixture 88 is bored to provide a generally cup-shaped socket 91 having a rounded bottom. As shown in FIGS. 2, 5 and 7, the fixtures 88 are adapted to hold $CO_2$ cartridges 95. As shown in FIG. 7, each of the fixtures 88 has an axially extending duct 92 in its annular wall which communicates with the socket 91 by means of a radially extending duct 93. The purpose of ducts 92 and 93 will be discussed further below.

Figures 3, 4:
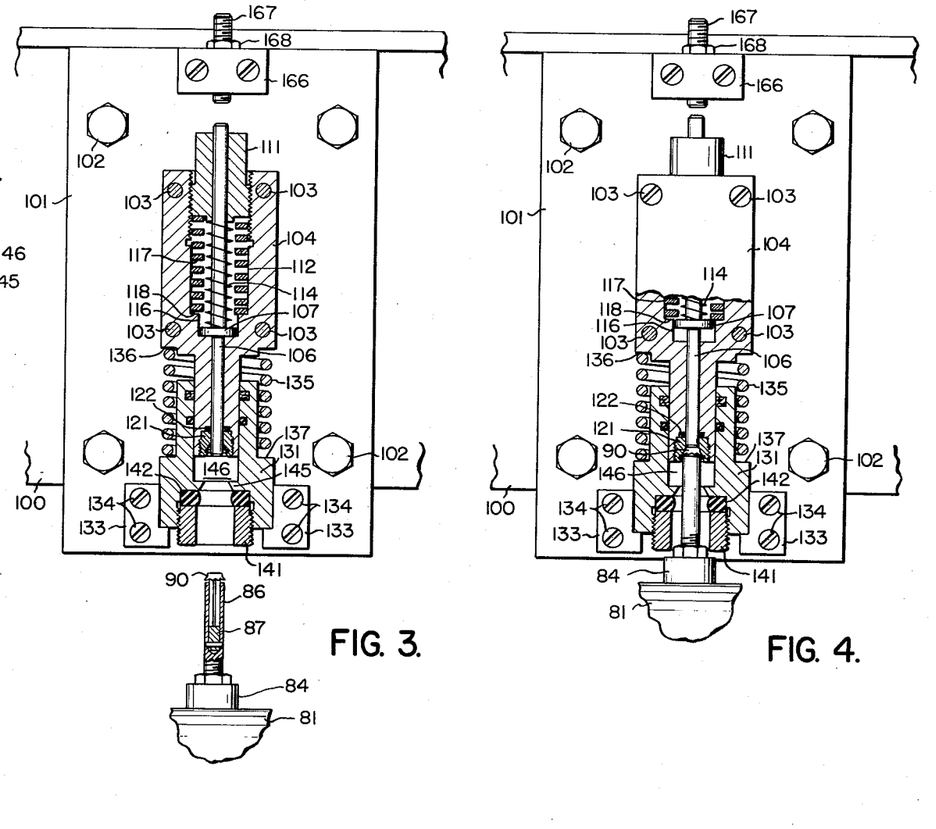
FIG. 3 is a further enlarged sectional view showing particularly the capping mechanism of the machine, a portion of the rotary cartridge and cap carrier being shown in position with one of its cap feeding stems indexed into alignment with the capping mechanism.
FIG. 4 is a view similar to FIG. 3 but illustrating the cap feeding stem and the carrier in upper or cap-placing position.

Extending parallel to drum 81, and positioned above the drum and slightly to one side of the vertical plane containing its axial centerline is a bar 100 (FIG. 2). Opposite ends of bar 100 are secured to the inner faces of end plates 27 adjacent the upper ends thereof. Six hanger plates 101 are secured by screws 102 (FIG. 3) to the front face of the bar 100 in laterally abutting relation. Secured to the front face of each hanger plate 101 by screws 103 is an axially bored block 104 (FIGS. 3, 4 and 7). The axial centerlines of blocks 104 intersect the axis of drum 81; and as the indexing mechanism 74 causes a respective row of fixtures 84 or 88 to be indexed into an upper, vertical position on carrier 81, each of the fixtures is disposed below and in registry with the associated block 104.

Axially slidable in the bore of each block 104 is a plunger 106 (FIGS. 3 to 7) which has a shoulder or flange 107 intermediate its ends. The upper end of each plunger 106 is slidable in the bore of an annular plug 111 which is threaded into a bore 112 in the upper end of associated block 104 (FIG. 3). Surrounding each plunger 106, and interposed between its shoulder 107 and the associated plug 111 is a coil spring 114 which constantly urges the plunger 106 axially downwardly in block 104 to seat the flange 107 of the plunger on the bottom of a counterbore 116 which communicates with the bore 112. A second coil spring 117, which is of considerably greater compressive strength than the coil spring 114, is mounted coaxially about each plunger 106 and each spring 114 in each bore 112. The upper end of each spring 117 abuts against the bottom of the associated plug 111, and its lower end abuts an internal shoulder 118 formed by counterbore 116 at the bottom of bore 112.

Threaded into a counterbore in the bottom of each block 104, and surrounding the lower end of the associated plunger 106, is an annular die 121 of tungsten carbide or the like (FIGS. 3 to 8). The upper end of each die 121 seats against an O-ring 122 which is mounted in a recess in block 104 and which surrounds the lower end of the associated plunger 106.

Each die 121 (FIG. 8) is counterbored to form a cylindrical wall portion 125 (FIG. 8) which is connected by a conical wall portion 126 with the bore 123 of the die. Seated in an annular groove 124 in the cylindrical wall portion 125 of each die, with its flat side up, is a metallic spring ring 127 of generally "C" shaped configuration and semi-circular cross section. In its relaxed condition, the inner diameter of ring 127 is slightly less than the diameter of the cylindrical wall portion 125 so that the ring 127 tends normally to project radially inwardly beyond the cylindrical wall portion 125. The portion of the counterbore wall which lies between ring 127 and the lower, terminal end of die 121 is chamfered as at 128.

The lower end of each block 104 is cylindrical and has a sleeve 131 (FIGS. 3 to 7) slidably mounted thereon for axial movement relative thereto. The lower face of each sleeve 131 rests upon the horizontally disposed legs of two "L" shaped brackets 133 which are secured by screws 134 to the face of the associated hanger plate 101 adjacent the bottom thereof and at diametrically opposite sides of sleeve 131. A coiled compression spring 135, which is disposed coaxially about each sleeve 131 between an external shoulder 136 on associated block 104 and an external shoulder 137 on sleeve 131, serves to urge sleeve 131 constantly downwardly against brackets 133.

Threaded into a counterbore in the bottom of each sleeve 131 is a ring 141 which has an inside diameter slightly larger than the outer diameter of the conventional $CO_2$ cartridge 95 so that the latter may pass therethrough. Each ring 141 serves to hold in place in the sleeve 131 an annular Teflon gasket 142 which has an inner diameter slightly less than the external diameter of the $CO_2$ cartridge. Above the gasket 142, each sleeve 131 has integral therewith a radially inwardly projecting ring flange 145 (FIGS. 3 to 8) whose inner surface is conical and is adapted to abut the upper end of a cartridge 95 thereby to limit the extent to which a cartridge may be inserted into sleeve 131. Above conical wall 145 is a chamber 146 which is formed in the bore of sleeve 131 between the lower face of block 104 and the upper face of flange 145.

Threaded into the side of each sleeve 131 is a plug 151 (FIGS. 5 and 6) which has a duct 152 therethrough that communicates at its inner end with associated chamber 146 immediately above the upper face of flange 145; and which at its opposite end communicates with a conventional valve 153 mounted on the outer end of plug 151. Each valve 153 is connected by a duct 161 (FIG. 5) with a supply manifold 163 (FIG. 1) and by a duct 162 with an exhaust manifold 165 (FIG. 1). Manifolds 163 and 165 are supported from uprights 21 by brackets 164, and are connected to a tank or other source (not shown) of liquid $CO_2$ under pressure. Each valve 153 may be spring-pressed in one direction and shifted in the opposite direction by energizing a solenoid 154. When solenoids 154 are deenergized, $CO_2$ is continuously circulated through each valve 153 and back to the $CO_2$ source without entering the chamber 146. When solenoids 154 are energized, each valve 153 may permit both of its associated ducts 161 and 162 to be connected to chamber 146 to allow continuous flow of liquid $CO_2$ through duct 152 into chamber 146, and back out of this chamber again to the tank or other source of $CO_2$ supply, thus preventing bubbling of the liquid in a chamber while a cartridge is being filled with gas.

Secured to the face of each hanger plate 101 adjacent the upper edge thereof, and projecting outwardly therefrom, is a block 166. Threaded in each block 166 is an adjustable stop screw 167 which is aligned axially with and above the vertically reciprocal plunger 106. Screw 167 is adapted to be locked in a vertically adjusted position in block 166 by nut 168 to thereby limit the upward movement of plunger 106 relative to block 104.

Mounted in six equally spaced apertures in a stationary bar 171 (FIG. 2), which extends between the end plates 27, are six cartridge feeding tubes or chutes 172, only one of which is shown in FIG. 2. In any indexed position of carrier 81, the axial centerlines of tubes 172 are radial of the axis of carrier 81; and each tube or chute 172 is in registry with that one of the six fixtures 84 or 88 of a respective row which happens to have been indexed into position in front of tubes 172. When the tubes or chutes 172 are in registry with the fixtures 88, empty cartridges 95 can slide, when released, from the chutes into the aligned sockets 91 of the fixtures. Adjacent the end thereof, which confronts carrier or drum 81, each chute 172 is slotted or cut away for a portion of its axial length so that the cap-carrying collets 89 are free to pass as they are indexed by carrier 81 past tubes or chutes 172.

Mounted beneath the tubes 172 is a rock shaft 173 (FIG. 2), which extends between end plates 27. Secured to the rock shaft are a plurality of detents 174, one for each chute. Secured in opposite ends of each lever 174 are pins 175 and 176 which are adapted to project through spaced openings 177 and 178 in the associated chute 172. The pins on each detent are spaced apart for a distance which is slightly less than the length of a $CO_2$ cartridge 95. The shaft 173 is adapted to be rocked by an arm 179 which has one end thereof secured to shaft 173 and which has the other end thereof connected through a pin and slot connection 180 to the plunger 181 of a solenoid 182 which is mounted on the bottom of bar 171. When solenoid 182 is deenergized, as shown, the pins 175 at the forward ends of levers 174 will project into the respective associated chutes 172 to engage the bottoms of the lowermost $CO_2$ cartridge 95 in the chutes 172 to prevent the latter from sliding out of the chutes 172. When energized, solenoid 182 causes levers 174 to be pivoted counterclockwise to withdraw the pins 175 from the tubes 172 to release the $CO_2$ cartridges that were theretofore blocked, and to move the pins 176 into tubes or chutes 172 so that the next $CO_2$ cartridges in the chutes will be held from sliding down the respective tubes 172 while the lowermost cartridges in the tubes are dropping into the sockets 91 of the fixtures 88. Subsequent deenergization of solenoids 182 causes levers 174 to be moved clockwise so that pins 176 are withdrawn from the chutes and pins 175 are once again inserted therein. Thereby the cartridges, which were held by pins 176 are released to slide down the chutes until they abut against the pins 175.

In order to insure that a $CO_2$ cartridge is fed from a respective tube or chute 172 when the cartridge is released by a pin 175, a stationary manifold 183 (FIG. 2) is mounted between end plates 27 above tubes 172. This manifold communicates with a supply of compressed air (not illustrated) by means of a valve 184 controlled by a solenoid 185. Connected to manifold 183 at six equally spaced points therealong are six nozzles 186, each of which communicates at one end with a port 187 which extends through the wall of a tube 172 at a point approximately abreast of the lowermost cartridge in the tube, thereby to apply air-pressure, when valve 184 is opened, on the cartridge to assist gravity in causing it to slide out of the tube.

Secured to a stationary bar 191 (FIG. 2), which extends between end plates 27 below carrier 181, are six equally spaced tubes or chutes 192 (only one of which is illustrated in FIG. 2) which are adapted to convey filled $CO_2$ cartridges away from carrier 81. The tubes or chutes 192 are diametrically opposite the tubes or chutes 172. The tubes 192 are disposed opposite one of the six indexing positions of the carrier, and each tube 192 is adapted to receive a filled $CO_2$ cartridge when a row of fixtures 88 holding the same happens to be indexed into position opposite these tubes 192 as shown in FIG. 2. As in the case of feed tubes 172, the ends of tubes 192 which are adjacent the carrier or drum 81 are slotted to permit the collets 89 to pass when they are indexed past tubes 192.

To aid in discharging the filled $CO_2$ cartridges from the fixtures 88, a stationary manifold 195 is mounted between the end plates 27 above tubes 192 and communicates with a supply of compressed air (not illustrated) by means of a valve 196 which is controlled by a solenoid 197. Connected to manifold 195 at equally spaced points therealong are six nozzles 198 which are positioned to direct compressed air into the ducts 92 (FIG. 7) which communicate with the bottoms of the sockets 91 of the fixtures 88 that have been indexed by drum 81 to align with the chutes 192. The blast of compressed air aids gravity and forces the $CO_2$ cartridge out of the fixture into the respective chute or tube 192.

Mounted in a stationary position below, and extending parallel to the axis of the carrier 81, is an elongate support bar 201 (FIG. 2). Bar 201 has six equally spaced apertures 202 therethrough each of which is aligned with a respective collet 87 when a row thereof is indexed into position above bar 201. Secured to the bottom of bar 201 coaxially of each aperture 202 is a sleeve 203 which has a counterbore 204 in the upper end thereof. Slidably positioned in each sleeve 203 coaxially thereof is a plunger 205 having an enlarged diameter upper end 206 axially slidable in the sleeve's counterbore 204 and the aperture 202 in bar 201 aligned therewith. At its lower end each plunger 205 projects out of the bottom of sleeve 203 and has a nut adjustably threaded thereon which abuts the bottom of sleeve 203 to limit upward movement of associated plunger 205. A coil compression spring 207 interposed between the plunger head 206 and the bottom of counterbore 204 surrounds plunger 205 and constantly urges the latter vertically upwardly so that the upper surface of its enlarged head 206 is disposed just below the upper surface of bar 201.

Mounted on a stationary plate 211 which extends between end plates 27 are six equally spaced hoppers 212 for supplying cartridge caps to the machine. Each hopper 212 is connected by a chute 213 to the top of bar 201 adjacent a respective aperture 202 therein. Conventional Syntron cap-feeding devices (not illustrated) in each of the hoppers 212 cause caps therein to be fed one by one down each chute 213 and into an inverted position on top of the associated head or platform 206.

Secured to both the front and back of frame 20 at the end thereof opposite the indexing mechanism 74 are two vertically spaced bars 223 and 224 (FIG. 1). Secured to the outer ends of bars 223 and 224 is a relatively large, rectangular panel 225. Secured to the outer face of the panel 225 adjacent the upper end thereof is a conventional Syntron control box 226 for the Syntron cap feeding devices (not illustrated) in the hoppers 212. Secured to panel 225 below Syntron control box 226, and designated generally at 227, is the housing for a sequence control mechanism comprising a plurality of cam-operated switches, and which will be described in more detail below. Secured to the board 225 below housing 227 in an emergency electrical stop 228. Secured to one of the lower supporting bars 223, and facing the front of the machine is an on and off switch 229. Secured in a horizontal row to the inner face of panel 225 are nine, spaced microswitches only one of which, 239, is illustrated in FIG. 1; and all nine of which are illustrated in the wiring diagram in FIG. 9 and identified respectively by the numerals 231 to 239, inclusive. Respective switches 231 to 239 are adapted to be actuated by nine cam members 241 to 249, respectively (FIGS. 1 and 2). Each of the cam members 241 to 249 is adjustably threaded on a vertically disposed screw 251. Nine such screws 251 are suspended in a vertical plane adjacent switches 231 to 239 by means of a horizontally disposed angle iron 253 which is carried by a bracket 254. Bracket 254 is fixed to the outer ends of two arms 255 which are secured to and project outwardly from the exterior of the slide 63 confronting panel 225. Cams 241 to 249 are thus made to reciprocate vertically with the drum or carrier 81 so that they will selectively engage and actuate the microswitches 231 to 239 at predetermined times during the vertical movement of carrier 81.

Figure 11:
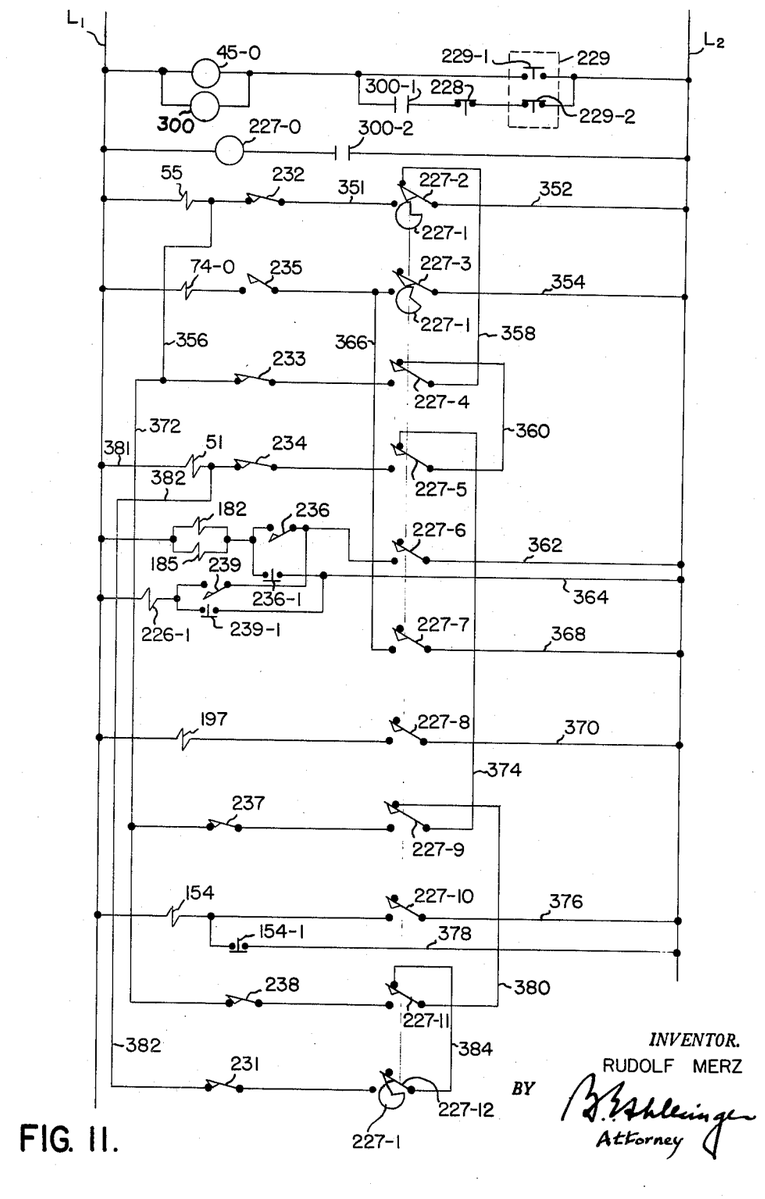
FIG. 11 is a wiring diagram illustrating the electric control circuit used for providing sequential operation of apparatus of the type described herein.

One way in which the machine may be wired electrically to accomplish its purpose, is illustrated diagrammatically in FIG. 11. The circuit includes the two main lines or wires L–1 and L–2, respectively, which are adapted to be connected to a power source. Connected in parallel between wires L–1 and L–2 is the motor 45–0 for the hydraulic pump 45 and the coil of a relay 300. The motor can be started and the relay can be energized by pushing the normally-open start button 229–1 of the manually operated start and stop switch 229. When the relay coil 300 is energized it closes normally-open switch arms 300–1 and 300–2 of the relay. Closing of switch arm 300–1 establishes a holding circuit to maintain motor 45–0 and relay 300 energized through the normally closed stop button 229–2 and the normally closed emergency stop switch 228. The closing of switch arm 300–2 energizes a motor 227–0 for operating control mechanism 227 which governs the movements of the carrier 81.

The control mechanism 227 comprises eleven cams 227–1, which are carried by a cam shaft driven by motor 227–0, and eleven double-throw switches 227–2 to 227–12, inclusive. The cams rotate as long as motor 227–0 is in circuit. Each of the eleven switches is positioned to be operated by one of the eleven cams 227–1 (three of which are shown diagrammatically in FIG. 11). These cams may be all alike, at least approximately, each having a notch into which the associated switch can drop to close a circuit, the rest of the peripheral surface of the cam being a dwell portion upon which the switch rides so that the switch is held open except when it is in the notch of its associated cam. The notches of the several cams are displaced angularly from one another so that the several switches are shifted in the desired sequence.

Assuming the machine has stopped with the carrier 81 in the position shown in FIG. 2, with a row of collets 87 positioned to pick caps 90 from the platforms 206, upon closing of switch 229–1 and actuation of motor 227–0, first of all, the cam 227–1 (FIG. 11), which is associated with switch 227–12, will rotate through a slight angle to permit switch 227–12 to close to its front position. This will close a circuit from line L–1 through line 381, solenoid 51, line 382, now-closed switch 231, switch 227–12 in its front position, line 384, switch 227–11 in its back position, line 380, switch 227–9 in its back position, line 374, switch 227–5 in its back position, line 360, switch 227–4 in its back position, line 358, switch 227–2 in its back position, and line 352 to main line L–2. This will energize solenoid 51 (FIGS. 1 and 11) and cause valve 48 to be shifted so that the hydraulic motive fluid will be applied to the upper end of cylinder 41 and force the carrier 81 to descend, until switch 231 is opened, so that the collets 87 in the row then at the bottom of the carrier are inserted into the open ends of the caps 90 on the platforms 206. Thereafter, further rotation of the cam shaft in mechanism 227 will cause switch 227–12 to be raised to back position and switch 227–2 to be moved to its lower front position to complete a circuit from terminal L–1, through solenoid 55, limit switch 232, line 351, switch 227–2 and line 352 to terminal L–2, thus energizing solenoid 55. At this time the remaining switches 227–3 to 227–12 are held by their respective associated cams 227–1 in their upper, back positions. With solenoid 55 energized, valve 48 (FIG. 1) is shifted so that piston rod 42, the slides 63, cams 241 to 249 (FIG. 2) and the drum or carrier 81 are moved vertically upwardly as a unit until limit switch 232 (FIG. 11) is opened by cam 242 (FIG. 2). Cam 242 is vertically adjusted on its respective screw 251 so that it will engage and open switch 232 at a time when carrier 81 is disposed substantially midway of its vertical movement as shown in FIGS. 1 and 2. The opening of switch 232 deenergizes solenoid 55 so that valve 48 returns to its neutral position, thereby halting the vertical movement of carrier 81.

Concurrently with the opening of switch 232, cam 245 (FIG. 2) engages and closes the normally open switch 235; switch 227–2 is raised by its cam 227–1; and switch 227–3 is permitted to drop thereby to complete a circuit from main line L–1, through solenoid 74–0, switch 235, switch 227–3 and wire 354 to main line L–2. Solenoid 74–0 is thus energized to cause the one revolution clutch mechanism 74 to index the carrier or drum 81 counterclockwise 60° from the position illustrated in FIG. 2.

Thereafter through operation of their associated cams 227–1, switch 227–3 is returned to its back position shown in FIG. 11 thereby deenergizing solenoid 74–0, and switch 227–4 is permitted to drop, thus closing a circuit from line L–1, through solenoid 55, line 356, normally-closed switch 233, the lowered switch 227–4, line 358, double-throw switch 227–2 in its upper position, and line 352 to line L–2. With solenoid 55 thus energized the carrier is again moved upwardly until the cam 243 opens switch 233, thereby halting the carrier in the position shown in FIG. 4. This upward movement of carrier 81 causes the row of collets 87, which have been indexed 60° from the position shown in FIG. 2, to push the caps 90 carried thereby through the mouths of the dies 121 and through the rings 127 (FIG. 8) in the dies until each cap 90 seats against the conical surface 126 of a die 121 and the lower edge of the skirt portion of the cap lodges on the upper surface of the ring 127.

Of course, the carrier or drum 81 must be indexed three times after start-up of a machine before collets carrying caps 90 will have arrived at a position to deliver cap into the dies; but once the machine is running caps will be delivered into the dies every second index of the carrier.

After the upward movement of carrier 81 has been halted by the opening of switch 233 by cam 243 (FIG. 2), double-throw switch 227–4 is returned, upon further rotation of the shaft carrying cams 227–1, to its back position and double-throw switch 227–5 drops to its front position to complete a circuit from line L–1 through solenoid 51, switch 234, switch 227–5, line 360, and switches 227–4 and 227–2 which are now in their upper, back positions, and line 352 to line L–2. The energized solenoid 51 causes the control valve 48 (FIG. 1) to be shifted so that fluid from pump 45 will force the piston in cylinder 41, and hence carrier 81, vertically downwardly until cam 244 (FIG. 2) opens switch 234. Cam 244 will have been adjustably positioned on its screw 251 so as to open switch 234 when carrier 81 once again reaches its mid or center position. The downward movement of carrier 81 causes collets 87 to be withdrawn from the capping mechanisms, and leaves the caps lodged in the mouth of a respective die 121.

Simultaneously with the opening of switch 234 by its cam 244, the cams 246 and 249 (FIG. 2) close the normally open switches 236 and 239. Thereafter, double-throw switch 227–5 is moved, in the further rotation of the control cams, to its upper, back position; and 227–6 drops to its lower, front position to energize simultaneously the cartridge feeding solenoid 182 (FIGS. 11 and 2), the air valve solenoid 185, which are connected in parallel, and a Syntron control solenoid 226–1. Solenoid 226–1 and switch 239 are connected in parallel with the solenoids 182, 185 and switch 236 between line L–1 and switch 227–6. The latter is connected through line 362 to line L–2.

As will be apparent from FIG. 2, the indexing step which caused collets 87 to be indexed into position beneath the capping mechanisms also caused a row of empty cartridge fixtures 88 to be indexed into alignment with the chutes or tubes 172. Therefore, upon energization of the solenoids 182 and 185, a new cartridge 95 is loaded into each fixture 88 of the row which is at this time aligned with the tubes 172. At the same time, solenoid 226–1 operates the Syntron mechanism 226 in a conventional manner to cause new cartridge caps 90 to be fed down the chutes 213 to the cap bearing platforms 206.

After cartridges have been loaded into the fixtures 88 and caps 90 have been delivered to the platforms 206, the associated cam 227–1 of the controller will rotate into position to open switch 227–6 thereby to deenergize solenoids 182, 185 and 226–1; and switch 227–7 drops to its lower position to energize the indexing solenoid 74–0 from line L–1, solenoid 74–0, switch 235, which is closed because carrier 81 is in its mid position, line 366, switch 227–7 and line 368 to line L–2. Carrier 81 is thus indexed a further 60° counterclockwise to a position similar to that illustrated in FIG. 2.

Thereafter double-throw switch 227–7 is moved by its cam 227–1 to its upper, back position to deenergize the indexing relay 74–0; and double-throw switch 227–8 is permitted to drop for a limited period of time into its lower, front position to energize solenoid 197 (FIG. 1) as will be described fully below. The first time the carrier is in a position like that shown in FIG. 2, after start-up of the machine, the energization of solenoid 197 will simply cause compressed air to be blown into an empty row of sockets 88 opposite chute 192; but after the machine is in full operation, a row of loaded cartridges 95 will be forced out of sockets 88 each time a row of such sockets is abreast of the chutes 192.

Thereafter, as the shaft carrying cams 227–1 continues to rotate, switch 227–8 is moved to its upper position to deenergize solenoid 197; and switch 227–9 drops to its lower position to energize solenoid 55 from L–1, through solenoid 55, lines 356 and 372, normally-closed switch 237, switch 227–9 now in its front position, line 374, switches 227–5, 227–4 and 227–2, which are in their upper, back positions, and line 352 to line L–2. With solenoid 55 energized, carrier 81 is elevated again until cam 247 opens switch 237. Cam 247 will have been previously adjusted on its screw 251 to open switch 237 when the carrier has elevated the row of empty cartridges 95, which is at the time uppermost on carrier 81, through the associated sleeves 141 until the upper, open ends of the cartridges 95 are disposed in the chambers 146 as shown in FIG. 5. So disposed, the neck of each cartridge in the then-uppermost row of cartridges extends above and through the inwardly projecting ring flanges 145 of the associated sleeves 131, and the associated resilient gasket 142 sealingly engages the outer surface of the associated cartridge 95 to close off the lower end of the respective chamber 146.

With the upper end of each empty cartridge 95 in the uppermost row positioned in a filling chamber 146, switch 227–9 will be moved by its cam 227–1 to its upper position; and switch 227–10 will be allowed by its cam 227–1 to drop to its lower position to energize the six solenoids 154 (only one of which is shown in FIG. 9) which control the six $CO_2$ feed valves 153 (FIG. 2). The circuit extends from L–1, through solenoids 154 (connected in parallel), switch 227–10 in its front, down position, and line 376 to line L–2. The energized solenoids 154 open valves 153 so that liquid $CO_2$ may flow under pressure through the feed lines 161 into the chambers 146, and into the cartridges 95 disposed therein. A manually operable switch 154–1 is connected in series with solenoids 154 between terminals L–1 and L–2 by means of line 378 so as to bypass the switch 227–10 so that solenoids 154 may be operated at any time.

While solenoids 154 are energized, switch 227–11 is permitted by its cam 227–1 to drop and energize the carrier elevating solenoid 55 by a circuit extending from L–1, through solenoid 55, line 356, line 372, the normally closed switch 238, switch 227–11 now in its down position, line 380, switches 227–9, 227–5, 227–4 and 227–2 which are in their upper positions, and line 352 to main line L–2. Solenoid 55 remains energized until cam 248 (FIG. 2) opens switch 238, so that the carrier 81 continues its upward travel, not only until the cartridges have been filled, but until the filled cartridges have moved upward to capping positions (FIG. 7). In this further upward movement, the cartridges 95 cause the sleeves 131 to be moved upwardly against the action of the springs 135 so that the chambers 146 are progressively reduced in size, thereby forcing excess $CO_2$ gas out of the chamber back into its supply line.

As the sleeves 131 move upwardly, the upper ends of the cartridges engage and urge the caps 90 upwardly and into the axial bores 123 (FIG. 8) of dies 121.

The caps 90 are preferably of the type shown in my pending application Ser. No. 66,253 above mentioned. Each is made of very thin metal so that it may be easily pierced when used in a gas-operated gun, for instance. It has a plane top surface 390 (FIGS. 9 and 10), and an outwardly flared, corrugated or fluted skirt 391 which can easily be pressed into the groove 392 around the neck of the cartridge between the collar 97 and the shoulder 393. The skirt portion of the cap has arcuately curved rises 394 which are of substantially uniform width from top to bottom and which alternate with flat triangular shaped lands 395 that decrease in width upwardly from the periphery of the skirt.

The diameter of the bore 123 of each die 121 (FIG. 8) is less than the outside diameter of the skirt portion of each cap 90 so that as the cap is moved up into the die by a cartridge, its skirt is compressed radially inwardly under the collar 97 (FIG. 6) on the cartridge and squeezed by the die around the neck of the cartridge (FIGS. 8 and 10), thereby sealing the latter. A compressible gasket 96 placed around the neck of each cartridge before delivery of the cartridges to the chutes 172 (FIG. 2) assists in the sealing.

As the upper end of each cartridge 95 enters the bore 123 of a respective die 121, each of the plungers 106 is urged axially upwardly until its upper end has engaged its associated limit screw 167 (FIG. 7); and so that its shoulder 107 engages and slightly compresses its associated spring 117. This spring is powerful enough to subsequently urge a cartridge 95 out of a die when the carrier 81 is lowered again subsequent to the capping step.

When the upward movements of the drum 81 and the cartridges 95 have been halted by the deenergization of solenoid 55 upon the opening of switch 238 by cam 248, the filled cartridges will have been sealed by caps 90, and the caps will have been sealed around the necks of the cartridges, and each of the chambers 146 have been substantially reduced in size as shown in FIG. 7, thus saving gas. Thereafter, switch 227–10 is returned to its upper position (FIG. 11) by its associated cam 227–1, to deenergize the $CO_2$ feed solenoids 154 so that the liquid $CO_2$ continues to circulate through valves 153 but is cut off from the chambers 146. The quantity of $CO_2$ which is exhausted to the atmosphere from chambers 146, when the cartridges are subsequently withdrawn from the dies 121, is thus reduced to a minimum.

After the cartridges 95 have been capped, switch 227–11 is moved by the associated cam 227–1 of the controller to its upper position in FIG. 11; and switch 227–12 closes energizing the solenoid 51 from line L–1 through solenoid 51, line 382, the normally closed switch 231, and switch 227–12, line 384, switches 227–11, 227–9, 227–5, 227–4, and 227–2, all of which are in their upper positions, to line 352 and line L–2. With solenoid 51 energized carrier 81 is moved downwardly until cam 241 opens switch 231. Cam 241 (FIG. 2) is adjusted on its screw 251 so that it opens switch 231 when the carrier 81 is disposed in the lowermost position of its vertical movement. The row of collets 87, which at this time extend downwardly from the bottom of carrier 81 (FIG. 2), will, therefore, pick up the caps 90 resting on the platforms 206.

Thereafter, the cycle is repeated. The carrier is again moved upwardly to its mid-position vertically to clear the platforms 206, and is indexed step-by-step to bring the row of collets 87, which now hold caps, step-by-step from their lowermost position into alignment with the dies 121. The collets pass freely through the slots 169 (FIG. 2) in the chutes 172 as the rows of collets are indexed around from their lowermost to their uppermost positions. When the collets have been indexed to their uppermost positions, the carrier is moved upwardly a distance determined by the setting of cam block 243 (FIG. 2); and the caps 90, which are carried by the row of collets, are pushed into the aligned dies 121 past the rings 127 (FIG. 6) and are lodged on the top of these rings. The carrier is then lowered to its mid-position vertically to withdraw the collets from the dies and clear the dies; and the carrier is again indexed.

During the indexing of the carrier, when each row of sockets 91 arrives abreast of chute 172 cartridges 95 are loaded into those sockets from the chute, the pin 175 of each rocker arm 174 being moved to disengaged position, and the ducts 186 associated with the several chutes being put on supply to force the lowermost cartridges 95 out of the chutes into the aligned sockets. Thus it is that, when the carrier is indexed, after withdrawal of a row of collets from the dies, that a row of empty cartridges 95 will be brought into registry with the dies, and the row of now unloaded collets 87, which have left the caps, that they carried, lodged in the dies, will be moved out of registry with the dies. After this indexing movement is completed, the carrier is again raised upwardly. This time, however, the necks of the empty cartridges enter the dies as far as permitted by the setting of cam block 247 (FIG. 2); and the gaskets 142 sealingly engage the peripheries of the cartridges. Then the $CO_2$ gas is supplied to the chambers 146 (FIG. 5) by opening valves 153, to fill the cartridges. As the upward travel of the carrier continues, the tops of the cartridges now in the dies, engage the registering caps 90 and force these caps off the rings 127 up into the bores 106 of the dies, thus causing the skirts of the caps to be squeezed and crimped around the necks of the respective cartridges; and at the same time this reduces the size of the chambers 146 forcing excess gas out of the chambers back into the respective supply lines, thus minimizing loss of gas.

After the row of cartridges has been capped, the carrier 81 is lowered again to its lowermost position so that the row of collets then at the bottom of the carrier pick up new caps. Then the carrier is returned to mid-position and indexed. This brings another row of collets carrying caps into alignment with the dies and moves the now-filled row of cartridges a step toward the discharge station. The now-uppermost row of collets is then lifted as before by upward movement of the carrier to lodge their caps in the dies. Then the carrier is lowered again and indexed. This brings the previously-filled row of cartridges to the discharge station and brings a new row of empty cartridges into alignment with the dies. At the discharge station the filled cartridges are discharged from their sockets 84 down chutes 192 by action of gravity and air pressure supplied from ducts 198 (FIG. 2). The carrier is then moved upwardly again to cap the empty row of cartridges, and is then lowered to cause the row of collets then at the bottom of the carrier to pick up caps. Then the carrier is indexed again to move the row of empty sockets a step on from the discharge station and bring new rows of empty collets into registry with the platforms 201. The operation proceeds as before.

When the carrier 81 has been indexed far enough to bring filled cartridges into registry with chutes 192, the switch 227-8 is closed to energize the solenoid 197 through line L-1, solenoid 197, switch 227-8 and line 370 to line L-2. Energization of solenoid 197 opens valve 196 and causes a blast of air to pass through each of the six nozzles 198 and into the ducts 92 and 93 in each of the cartridge fixtures 88 disposed adjacent to tubes 192 so that the filled cartridges are forced out of their respective fixtures 88 and into the chutes or tubes 192.

The manually-operable switches 236-1 and 239-1 are connected in parallel with the switches 236 and 239, respectively, and by a line 364 directly to line L-2 thereby to bypass controller 227 and to permit the energization of solenoids 182, 185 and 226-1 at any time desired.

It will be apparent from the foregoing description that a relatively compact and efficient machine has been provided for rapidly filling and capping $CO_2$ cartridges without resorting to welding. Moreover, the caps may readily be removed from exhausted cartridges to permit refilling of the latter. Moreover, by reducing the size of a respective chamber 146 during the filling and capping of a cartridge, the quantity of excess fluid in the chamber which is exhausted to the atmosphere after capping is substantially minimized. Moreover when the chambers are exhausted to atmosphere at the end of a filling operation, the expansion of the liquified $CO_2$ to gaseous form will cool the heads 131 so that the heads are kept cold and since there is no high temperature operation involved, such as a welding step for securing caps to the filled cartridges, even propane and other highly inflammable gases can be handled by the machine with reasonable safety. Also, by providing a steady flow of liquid $CO_2$ through valve 153 and ducts 161 and 162, the forming of objectionable gas bubbles in the $CO_2$ supply is minimized. Moreover, while the apparatus has been described with respect to the use of liquid $CO_2$ for filling cartridges, it is apparent that cartridges may be filled by this machine with other fluids.

The dies 121 (FIGS. 3 and 6) are preferably made of tungsten carbide or similar hard material to easily form and crimp the caps 90 about the necks of cartridges 95 without appreciable wear.

The chambers 146 and the cartridges are preferably filled at 300 lb. pressure but can be filled at pressures up to 900 lb. or more.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for filling cartridges with gas under pressure and for capping the cartridges, comprising
   (a) a head having a fixed portion and portion movable relative to said fixed portion toward and away from said fixed portion,
   (b) said two portions together forming between them a chamber whose volume varies with the distance between said portions,
   (c) spring means constantly urging said portions away from one another,
   (d) a female die secured in said fixed portion, at one side of said chamber and confronting said chamber,
   (e) means for holding a skirted cap in front of said die in operative relation to said die,
   (f) an annular resilient sealing member sealing said chamber at the opposite side thereof from said die, said sealing member being secured in said movable portion in registry with said die and in front of said holding means,
   (g) a duct for supplying fluid under pressure into said chamber and for conducting the fluid therefrom, and
   (h) means for successively placing a skirted cap on said holding means, and for moving the open end of an open-ended cartridge into said chamber and into operative engagement with said sealing member,
   (i) means for thereafter supplying fluid under pressure to said duct to cause the pressure fluid to flow into said chamber and into the cartridge, and
   (j) means for thereafter actuating said cartridge moving means to cause said cartridge by engagement of said cartridge with said sealing member to move said movable portion of said head toward the fixed portion thereof to cause said open end of said cartridge to force the cap off said holding means and into said die to cover said open end and to cause said die to crimp the skirt of the cap sealingly around the cartridge adjacent said open end, and simultaneously to reduce the volume of said chamber thereby to force excess fluid out of said chamber back into said duct.

2. A machine as claimed in claim 1, wherein,
   (a) a stripper rod is reciprocably mounted in said die in position to be engaged by a cap when the cap is forced into the die, and
   (b) spring means is provided constantly urging said rod in a direction to strip, by engagement with the cap, a capped cartridge from said die after the cartridge is capped.

3. A machine for filling hollow containers with fluid under pressure, comprising
   (a) a frame,
   (b) at least one housing mounted on said frame and having a chamber with an opening at one side thereof,
   (c) means in said chamber for holding a cover,
   (d) a movable carrier mounted on said frame,
   (e) a first fixture on said carrier for holding a hollow container of the type having an opening in one end thereof,
   (f) a second fixture on said carrier for holding a cover for said container,
   (g) indexing means for moving said carrier to move said second and said first fixtures successively into registry with the opening in said chamber,
   (h) drive means operative, when one of said fixtures is in registry with said opening, to reciprocate said carrier toward and from said housing successively to insert said cover into said holding means, and the open end of the container into said opening in said chamber,
   (i) means operative to admit fluid under pressure to said chamber to fill a container when the open end thereof is inserted in said chamber opening, and (j) means causing a cover held by said holding means to be secured over the open end of a container when it is filled.

4. A machine for filling cartridges with gas under pressure and for capping the cartridges, comprising
 (a) a head having a chamber therein,
 (b) an indexably movable carrier reciprocable toward and away from said head, and having a position intermediate its extreme positions of reciprocation in which it is indexed,
 (c) a plurality of cap-carrying collets mounted on said carrier for holding skirted caps,
 (d) a plurality of cartridge holders mounted on said carrier, said collets alternating with said cartridge holders in the direction of indexing movement of said carrier,
 (e) means for supplying caps to at least certain of said collets upon each movement of said carrier to its extreme position away from said head,
 (f) means for feeding cartridges to at least certain of said holders, when said carrier is in its indexing position,
 (g) a female die mounted in said head at one side of said chamber to confront said chamber, said head having an opening therein in registry with said die and communicating with said chamber,
 (h) means for rotatably indexing intermittently said carrier step-by-step to bring said collets and cartridge holders alternately into registry with said opening, when said carrier is in its indexing position, and
 (i) means for moving said carrier toward said head to insert each of said collets, when is registry with said head, through said opening to place the cap carried by the collet on said holding means, and for moving said carrier to its extreme position toward said head, when a cartridge holder is in registry with said opening to insert said cartridge into said opening to cause the cartridge to engage the cap on said holding means thereby to cover the cartridge and to force the cap into said die to crimp the skirt of the cap around the cartridge, and
 (j) means for admitting fluid under pressure into said chamber when a cartridge enters said chamber and before it engages the cap, thereby to fill the cartridge with fluid before capping the cartridge.

5. A machine for filling cartridges with gas under pressure and for capping the cartridges, comprising
 (a) a rotatably indexable carrier,
 (b) a plurality of cap-carrying collets mounted on said carrier for holding skirted caps,
 (c) a plurality of cartridge holders mounted on said carrier, said collets alternating with said cartridge holders and said collets and cartridge holders being equi-angularly spaced from one another around said carrier,
 (d) a supply source for caps,
 (e) a supply source for cartridges,
 (f) a capping and filling station,
 (g) said supply sources and said station being equi-angularly spaced about the axis of said carrier a distance equal to twice the angular spacing of said collets and cartridge holders, whereby at least one of said collets registers with the collet supply source when one of said cartridge holders registers with said station and vice-versa one of the cartridge holders registers with said cartridge supply source when one of said collets registers with said station,
 (h) means for intermittently indexing said carrier to cause said collets to register with said cap supply source, and to cause said holders to register with said cartridge supply source and to cause said collets and holders to register alternately with said station,
 (i) means for moving said carrier in one direction radially of its axis to cause each collet to pick up a cap from the cap supply source when a collet is in registry with said cap supply source,
 (j) means for supplying a cartridge from said cartridge supply source to a cartridge holder when a cartridge holder is in registry with said cartridge supply source, and
 (k) means for controlling the movements of said carrier and of said cartridge supply to cause said carrier to move first in one direction radial of its axis to cause a collet to pick up a cap from said cap supply source, then to move said carrier in the opposite direction radially of its axis back to a mid-position, then to index said carrier, then to supply a cartridge to a holder from said cartridge supply, then to move said carrier further in said opposite direction to cause said collet to place a cap at said station, then to move said carrier radially of its axis back to mid-position again, then to index said carrier, then to move said carrier again in said opposite direction to cause a holder to move a cartridge into said station to fill and cap said cartridge, then to move said carrier again back radially of its axis in said one direction to repeat the cycle.

6. A machine as claimed in claim 5, wherein
 (a) said capping and filling station has a chamber therein and comprises
 (b) a female die,
 (c) means in front of said die for holding the cap placed at said station, so that each cartridge, when moved by said carrier into said station, engages the associated cap to cover the cartridge and moves the cap into the die to cause the die to crimp the cap about the cartridge.

7. A machine for filling cartridges with gas under pressure and for capping the cartridges, comprising
 (a) a head having an expansible and contractable chamber therein,
 (b) a female die mounted in said head at one side of said chamber and confronting said chamber,
 (c) means for conducting fluid under pressure into said chamber and for conducting the fluid therefrom,
 (d) means for holding a skirted cap in front of said die, and
 (e) means for moving a cartridge into said chamber successively to engage said head and the cap to cause the cap to cover the cartridge and to force the cap into the die to crimp the cap about the cartridge, and
 (f) means positioned to be engaged by the cartridge as it moves into the chamber whereby said chamber is contracted as the cartridge is moved into the chamber to force fluid from the chamber into said conducting means, said fluid conducting means comprising
 (g) a duct connected to said chamber,
 (h) a supply manifold for supplying fluid under pressure to said duct,
 (i) an exhaust manifold for conveying fluid away from said duct upon the contraction of said chamber,
 (j) a valve connected to said supply and exhaust manifolds and operative to control the flow of said fluid into and out of said chamber; and
 (k) means operable by said cartridge moving means to move said valve to fluid supply position to connect said supply manifold to said chamber through said duct, when the cartridge is moved into engagement with said head.

8. A machine for filling hollow containers with fluid under pressure, comprising
 (a) a frame having thereon a housing open at one end,
 (b) cover holding means in said housing,
 (c) a rotatable drum mounted on said frame for rotation about its axis and for reciprocation transverse to said axis toward and away from the open end of said housing,
 (d) a first plurality of fixtures on said drum for removably holding a plurality of covers, (e) a second plurality of fixtures on said drum for removably holding a plurality of hollow containers, each of said containers having an opening in one end thereof,
(f) indexing means for intermittently rotating said drum into different angular positions about its axis, successively to register said first and second fixtures, respectively, with the open end of said housing,
(g) means for reciprocating said drum toward and away from the open end of said housing alternately with indexing of said drum successively to transfer a cover from a first fixture to said holding means, and to position the open end of a container held by one of said second fixtures in the open end of said housing, and
(h) means for filling a container with fluid under pressure, when the open end thereof is positioned in said opening, said cover holding means including,
(i) means for securing the cover held therein over the open end of the filled container before the withdrawal thereof from said housing.

9. A machine as defined in claim 8, including
(a) means for feeding covers to said first fixtures before the indexing thereof into registry with said housing opening,
(b) means for feeding containers to said second fixtures before the indexing thereof into registry with said housing opening, and
(c) means for removing filled containers from said second fixtures after the withdrawal of the containers from said housing opening.

10. A machine as defined in claim 9 wherein said cover feeding means comprises
(a) means for supporting a cover on said frame to register with one of said first fixtures, when a second fixture is in registry with said housing opening, and
(b) said drive means is operative to reciprocate said drum into its extreme position away from said housing opening, upon withdrawing a container from said opening, and
(c) each of said first fixtures has thereon means for picking up a registering cover from said supporting means, when said drum is reciprocated into the last-named position.

11. A machine as defined in claim 8, including
(a) a plurality of cams mounted to reciprocate with said drum,
(b) a plurality of switches mounted on said frame for operation by said cams, and
(c) electric circuit means connected to said switches and operable thereby to control the motion of said drum.

12. A machine for filling cartridges with gas under pressure, and for capping the cartridges, comprising
(a) a frame,
(b) a plurality of housings, on said frame, each of said housings having an opening in one end thereof,
(c) a drum movably mounted on said frame,
(d) a plurality of cap-holding fixtures arranged on the exterior of said drum in angularly spaced and axially extending, parallel rows,
(e) a plurality of cartridge-holding fixtures arranged on the exterior of said drum in parallel rows which alternate with the rows of cap-holding fixtures,
(f) means for intermittently rotatably indexing said drum about its axis successively to register said rows one by one with the openings in said housings,
(g) means for feedings caps to each of said cap-holding fixtures before they are indexed into registry with said openings,
(h) means for feeding empty cartridges to each of said cartridge-holding fixtures before they are indexed into registry with said openings,
(i) means for transfering caps into said housings from a row of said cap-holding fixtures each time a row of the latter registers with said openings,
(j) means for filling cartridges with fluid under pressure each time a row of said cartridge-holding fixtures is indexed into registry with said openings,
(k) means for securing over the filled cartridges the caps which are transferred to said housings by said cap-holding fixtures, and
(l) means for removing filled cartridges from said cartridge-holding fixtures before feeding empty cartridges thereto.

13. A machine as defined in claim 12, wherein
(a) each of said rows of said cap-holding fixtures is positioned diametrally opposite one of said rows of cartridge holding fixtures,
(b) said cap-holding fixtures comprise collets which project radially outwardly from said drum,
(c) said cartridge-holding fixtures define radial recesses in said drum,
(d) said cap-feeding means is operative to press generally cup-shaped caps resiliently over each of said collets for transfer thereby to said housings, and
(e) means is provided for actuating said cartridge feeding means to insert the closed end of an empty cartridge into each of said recesses after the removal of filled cartridges therefrom.

References Cited by the Examiner

UNITED STATES PATENTS

| | | | |
|---|---|---|---|
| 1,186,481 | 6/16 | Kaye | 53—306 X |
| 2,235,583 | 3/41 | Kronquest et al. | 53—88 |
| 2,411,232 | 11/46 | Sedwick | 53—308 X |
| 2,418,328 | 4/47 | Bach et al. | 53—85 |
| 2,481,042 | 9/49 | Tomasek et al. | 53—83 X |
| 2,947,126 | 8/60 | Focht | 53—88 |
| 3,063,210 | 11/62 | Parodi | 53—88 X |

GRANVILLE Y. CUSTER, Jr., *Primary Examiner.*

TRAVIS S. McGEHEE, *Examiner.*